United States Patent [19]

Kooi

[11] 4,130,340
[45] Dec. 19, 1978

[54] TWO-SPEED TELESCOPE FOCUSING MECHANISM
[75] Inventor: J. Peter E. Kooi, Succasunna, N.J.
[73] Assignee: Keuffel & Esser Company, Morristown, N.J.
[21] Appl. No.: 815,126
[22] Filed: Jul. 13, 1977
[51] Int. Cl.² .............................................. G02B 7/10
[52] U.S. Cl. ...................................... 350/79; 350/47; 350/255
[58] Field of Search ...................... 350/42, 44, 46, 47, 350/77, 79, 84, 187, 255

[56] References Cited
U.S. PATENT DOCUMENTS
2,155,570  4/1939  Trautmann .............................. 350/79
3,492,059  1/1970  Shio ........................................ 350/46

Primary Examiner—F. L. Evans
Assistant Examiner—Matthew W. Koren
Attorney, Agent, or Firm—Lionel N. White

[57] ABSTRACT

Focusing mechanism for a telescope utilized in geodetic instruments and the like comprises a pair of manually accessible ring members mounted coaxially of the line of sight axis at the eyepiece end of the telescope. Rapid image acquisition is effected by means of a first of the rings which is associated with a multiple lead screw element while fine focusing is obtained by means of the second ring member which operates a single screw thread drive for the draw tube focusing lens assembly.

7 Claims, 4 Drawing Figures

TWO-SPEED TELESCOPE FOCUSING MECHANISM

BACKGROUND

Focusing of geodetic instruments has for some time been effected by means of a focusing lens mounted in a draw tube located within the telescope near the objective end. Axial displacement of the draw tube by means of a rack and pinion mechanism driven from an external knob has been typical of these previously available telescope focusing means. Representative of such focusing mechanisms is that shown in U.S. Pat. No. 3,220,297. The rather awkward focusing operation which required the operator to move his attention from the sighted target in order to acquire the focusing knob has been obviated in the focusing mechanism of the present invention.

SUMMARY

In this novel means of focusing geodetic telescopes and the like, there are provided a pair of manually accessible ring members which are mounted coaxially about the line of sight axis of the telescope closely adjacent to the eyepiece of the instrument. In the act of focusing the telescope, the operator need merely grasp any portion of a desired focusing ring member in order to obtain rapid or slow advancement and recovery of the draw tube focusing subassembly.

An elongated drive rod member extends from the focusing draw tube back to the advancement mechanism associated with the focusing rings at the eyepiece end of the telescope. A head element of the drive rod engages an annular groove in a drive ring member mounted coaxially with the line of sight of the telescope near the eyepiece and generally within the confines of the manually accessible focusing rings and transfers drive ring movement to the drive rod.

A pair of threaded block members set diametrically opposed with respect to the line of sight are interposed between the internal threaded surface of the drive ring and an externally threaded cylindrical sleeve member mounted coaxially with the line of sight on a tubular extension of the telescope body. The external threads of the sleeve member and the matching threads on one face of the block elements are of a multiple lead configuration and effect a rapid advancement of the blocks and the associated drive ring upon rotation of the sleeve member. The first of the pair of focusing ring members is affixed to the threaded sleeve member and provides the means by which the operator may manually rotate the threaded sleeve for obtaining the rapid advancement.

The second of the focusing ring elements comprises internally extending tongues which engage longitudinal splines in the outer circumference of the drive ring and by means of which the drive ring may be rotated about the pair of block members while in engagement with the single lead thread faces of those blocks to thereby effect a slow advancement of the drive ring. With any advancement or recovery of the drive ring, the drive rod member will cause the focusing draw tube assembly to likewise be advanced or recovered to effect the focusing in the instrument at the rapid or slow rate determined by operator selection of the appropriate focusing ring member.

DESCRIPTION OF A PREFERRED EMBODIMENT

The present invention may be seen in a preferred form in the accompanying drawings of which FIG. 1 is a broken sectional view of a builder's level telescope embodying the invention;

Figure 1:
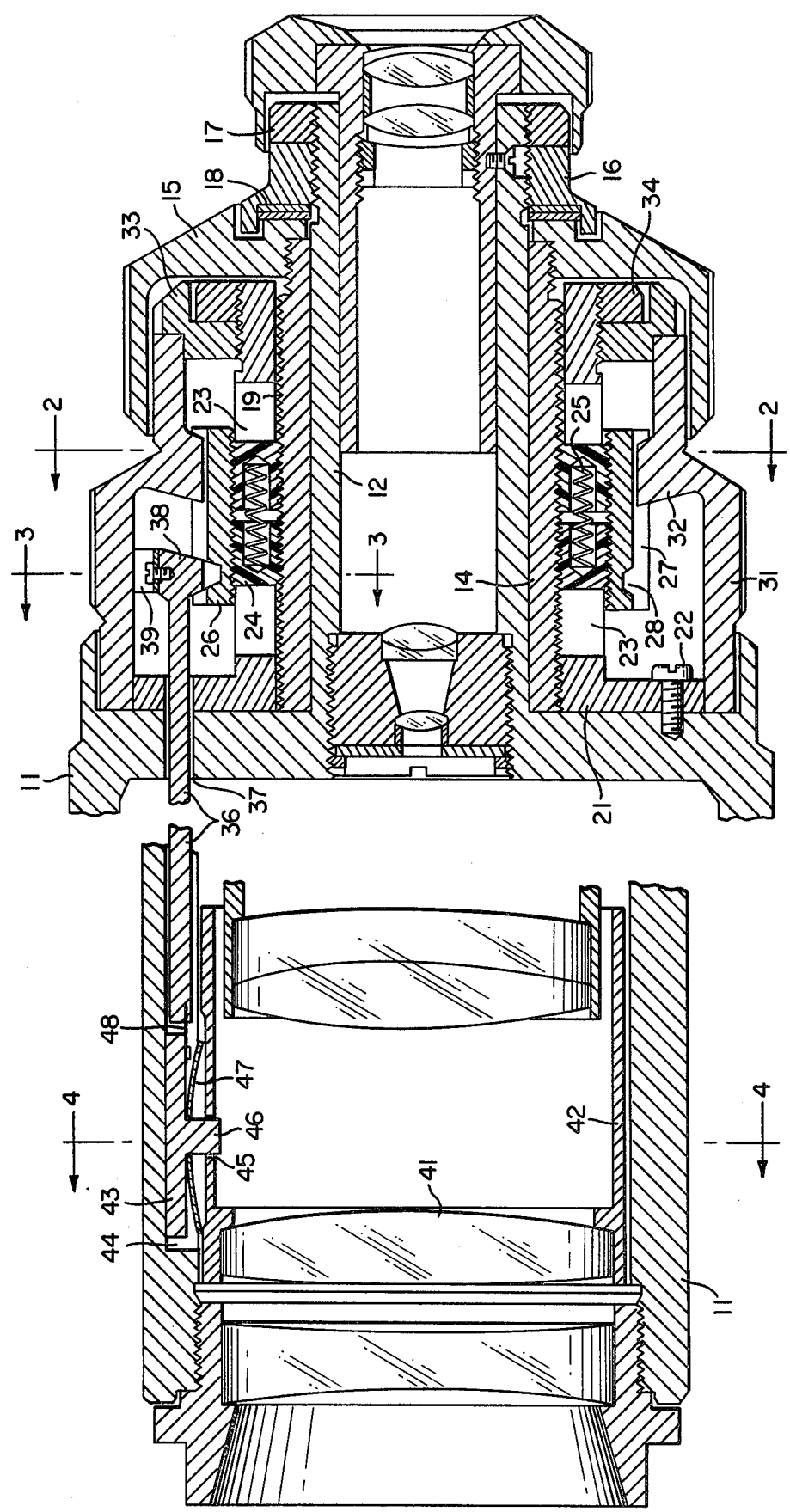

As seen in FIG. 1, the telescope body 11 extends to an eyepiece barrel portion 12. Journaled upon the eyepiece barrel 12 is an externally threaded sleeve cylinder 14, the major body threads 19 of which have multiple leads, being for example quadruple thread in this preferred embodiment. A first focusing ring member 15 is threaded onto the sleeve 14 and serves as means of manually rotating sleeve 14 upon eyepiece barrel 12. The sleeve and focusing ring subassembly are retained upon eyepiece barrel 12 by means of retaining nut 16 and lock nut 17 with interposed spring washers 18 by means of which the desired degree of friction in the rotation of ring 15 is achieved.

A flanged sleeve 21 is mounted to scope body 11 by means of screws 22 or the like. Diametrically opposed guide slots 23 in the wall of sleeve 21 receive paired sets of drive blocks 24 which are constructed of a low friction material, such as Delrin plastic. The circumferential faces of blocks 24 are threaded, the inner faces having the multiple threads of sleeve 14 while the outer faces bear single screw threads. A compression spring 25 received in bores in the bodies of blocks 24 bias the members of each block pair apart in the longitudinal direction to maintain constant contact between the thread faces and ensure against backlash in the thread-driven motion between sleeve 14 and blocks 24.

Figure 2:
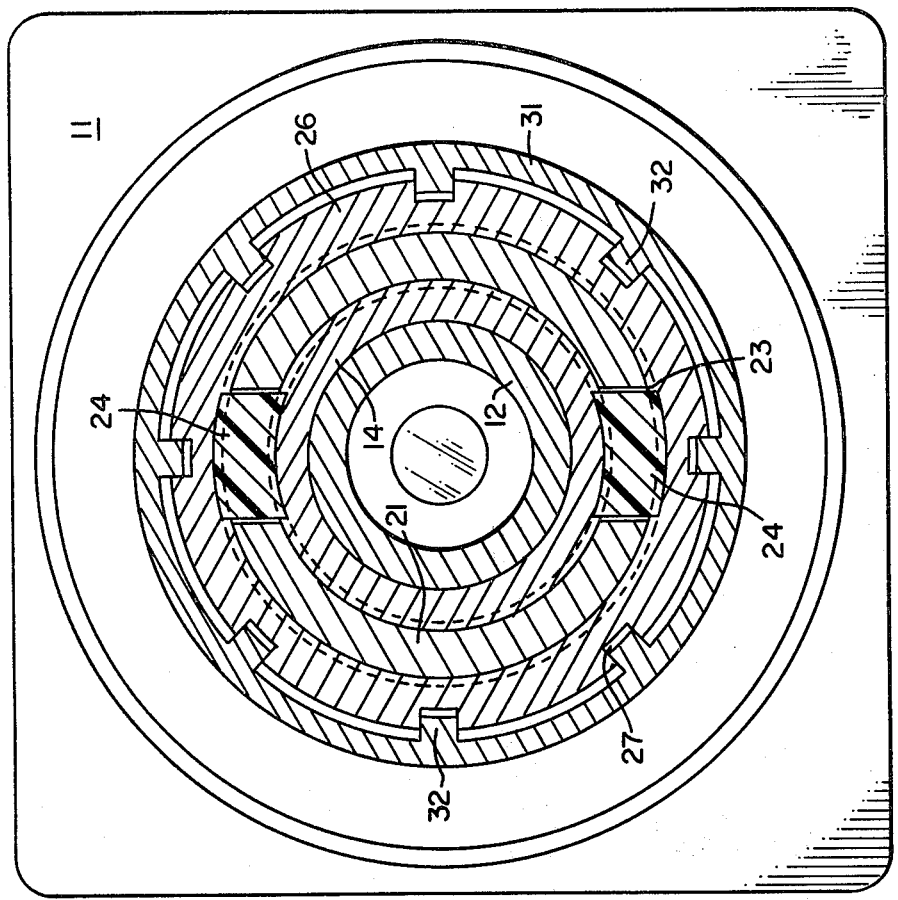
FIG. 2 is an elevational view in section taken at 2 — 2 in FIG. 1.
Figure 4:
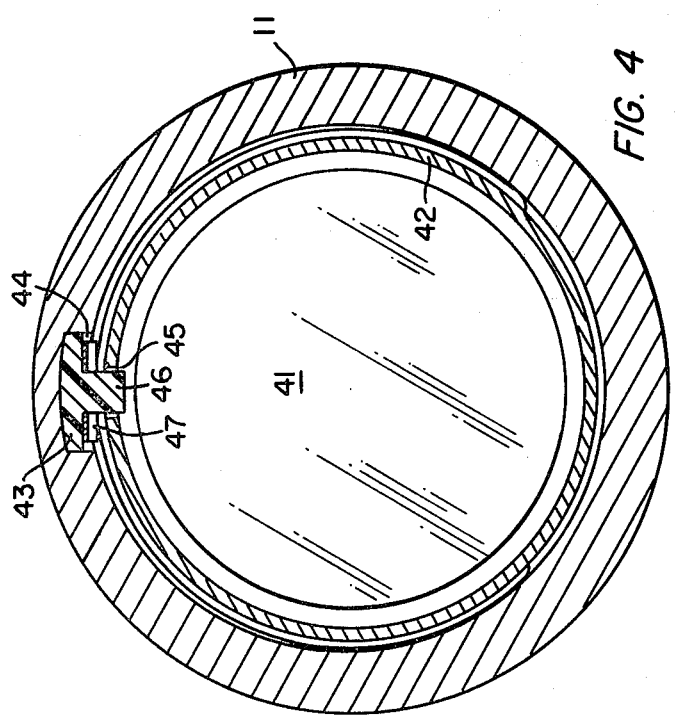
FIG. 4 is an elevational view in section taken at 4 — 4 in FIG. 1.

Encompassing the outer threaded faces of blocks 24 and in threaded engagement with the single lead threads of those block faces is splined drive ring 26 in the external circumference of which is cut an annular groove 28. A second focusing ring member 31 journaled upon the shoulder of flange member 21 has a plurality of internal tongues 32 which match in number and are received in the spline slots 27 of drive ring 26. The manner of engagement of tongues 32 with splined ring 26 may be seen more clearly in FIG. 2. Journal bushing 33 and lock nut 34 threaded onto the end of flanged sleeve 21 complete the second focusing ring subassembly.

The two-speed motion in the present invention derives from the employment of one or the other of the coaxial focusing ring subassemblies described above. Thus, rotation of fast motion ring 15 causes rotation of sleeve 14 and screw advancement of blocks 24 at the rapid rate dictated by multiple threads 19. The stationary threaded engagement between blocks 24 and drive ring 26 cause that ring member to advance at the rapid rate as well. Spline slots 27 of ring 26 allow such movement along tongues 32 to proceed unhindered.

Rotation of focusing ring 31, on the other hand, brings tongues 32 into engagement with the walls of slots 27 of ring member 26 resulting in the rotation of drive ring 26 and its advancement along the course of the single lead thread on the outer faces of blocks 24 which are now held in place by their engagement with stationary threads 19. In this manner drive ring member 26 will be advanced rapidly with the rotation of focusing ring 15 and slowly with the rotation of focusing ring 31.

Figure 3:
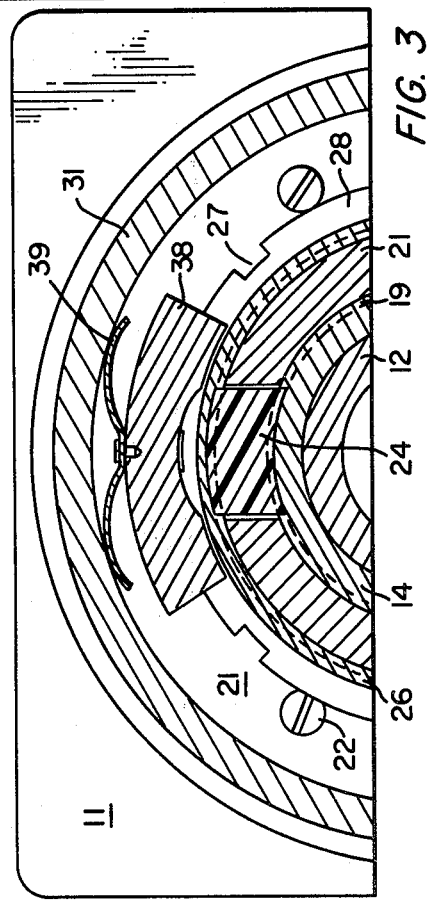
FIG. 3 is an elevational view in section taken at 3 — 3 in FIG. 1.

A drive rod member 36 extends through a port 37 in the wall of body 11 from the eyepiece region to the objective region of the telescope and transfers the two-speed motion to the focusing draw tube 42 of the instrument. The eyepiece end of drive rod member 36 terminates in a headpiece 38 which is received in annular groove 28 of splined drive ring 26 and is retained in that position by leaf spring 39 which bears on the inner wall of ring member 31. The disposition of these members may be more clearly seen in FIG. 3. Rod member 36 is thus caused to follow the longitudinal movement of ring 26 due to the engagement therewith of headpiece 38.

The focusing in the telescope is effected in the normal manner through the use of a focusing lens 41 mounted in a draw tube 42 which is moved longitudinally of the instrument to effect the change in focus. A longitudinal guide slot 44 cut along the inner surface of telescope body 11 receives slide block 43 which, in the manner of drive blocks 24, is constructed of a low friction plastic material. Slide block 42 is attached to rod member 36 by means of a flexible coupling 48, such as a short strip of berylium-copper alloy. This flexible coupling ensures against any undue torsional stresses being transfered to slide block 43. A lug 46, extending from block 43, is received in an opening 45 in the wall of draw tube 42 and effects the engagement of these members for positive transfer of the focus drive motion. A leaf spring 47 establishes a bias separating block 43 from the external wall of draw tube 42 thereby achieving a firm sliding contact between lower circumferential surfaces draw tube 42 and the inner surface of telescope body 11.

By means of the above-described mechanism an operator may obtain the rapid acquisition of a rough image focus upon rotation of focusing ring 15 and may then readily perfect the image focus with slight hand movement to acquire and rotate slow speed focusing ring 31.

What is claimed is:

1. In a telescope including an internal draw tube mounting a focusing lens and being displaceable longitudinally of said telescope to effect the focus of the image of a scene under observation, the improvement which comprises a two-speed focusing mechanism comprising:
   (a) a threaded sleeve member journaled for rotation about the line of sight of said telescope, the threads being situated on the external circumference of said sleeve member and being of multiple lead configuration;
   (b) a threaded drive ring member disposed concentrically about said sleeve member for rotation about said line of sight, the threads being situated on the internal circumference of said ring member and being of a configuration comprising a lesser number of leads than that of said sleeve member;
   (c) a plurality of threaded drive block members interposed between and in threaded engagement with the respective threaded surfaces of said sleeve and ring members, said block members being constrained to movement substantially parallel to said line of sight;
   (d) first manually-accessible means associated with said sleeve member for effecting rotation of said sleeve member;
   (e) second manually-accessible means associated with said drive ring member for effecting rotation of said ring member; and
   (f) means coupling said drive ring member with said draw tube for effecting said focusing draw tube displacement with longitudinal displacement of said drive ring.

2. The improved focusing mechanism according to claim 1 wherein said first means for effecting rotation comprises a first focusing ring member affixed to said sleeve member and disposed coaxially therewith at the eyepiece end of said telescope.

3. The improved focusing mechanism according to claim 1 wherein said second means for effecting rotation comprises a second focusing ring member journaled for rotation coaxially with said drive ring member and disposed at the eyepiece end of said telescope, said second focusing ring member including means engaging said drive ring member for transferring rotary force thereto to effect said rotation.

4. The improved focusing mechanism according to claim 3 wherein said drive ring member includes spline slots in the external circumferential surface thereof, and said second focusing ring member is situated concentrically about said drive ring member and includes tongue elements extending inwardly to engagement with said spline slots, whereby said drive and focusing ring members can exhibit only a longitudinal degree of freedom of movement therebetween, rotary movement of said focusing ring member effect a like rotary movement of said drive ring.

5. The improved focusing mechanism according to claim 1 wherein said first and second means for effecting rotation comprise first and second focusing ring members disposed coaxially with said telescope line of sight and closely adjacent one another and the eyepiece of said telescope.

6. The improved focusing mechanism according to claim 1 wherein each of said drive block members comprises a pair of threaded block elements arranged longitudinally of said telescope line of sight biased apart in said longitudinal direction.

7. The improved focusing mechanism according to claim 1 wherein said drive ring member includes an annular groove in the external circumferential surface thereof, and said coupling means comprises an elongated rod member extending longitudinally within the body of said telescope from an objective end coupled to said draw tube to a headpiece engaging said groove, said rod member thereby following the longitudinal movements of said drive ring member to transfer and effect like movements in said draw tube.

* * * * *